Dec. 21, 1965 L. G. McLAUGHLIN 3,224,979
REMOVAL OF METAL CONTAMINANTS BY USE OF MERCAPTO-COMPOUND AND CATION EXCHANGE RESIN
Filed Feb. 8, 1963
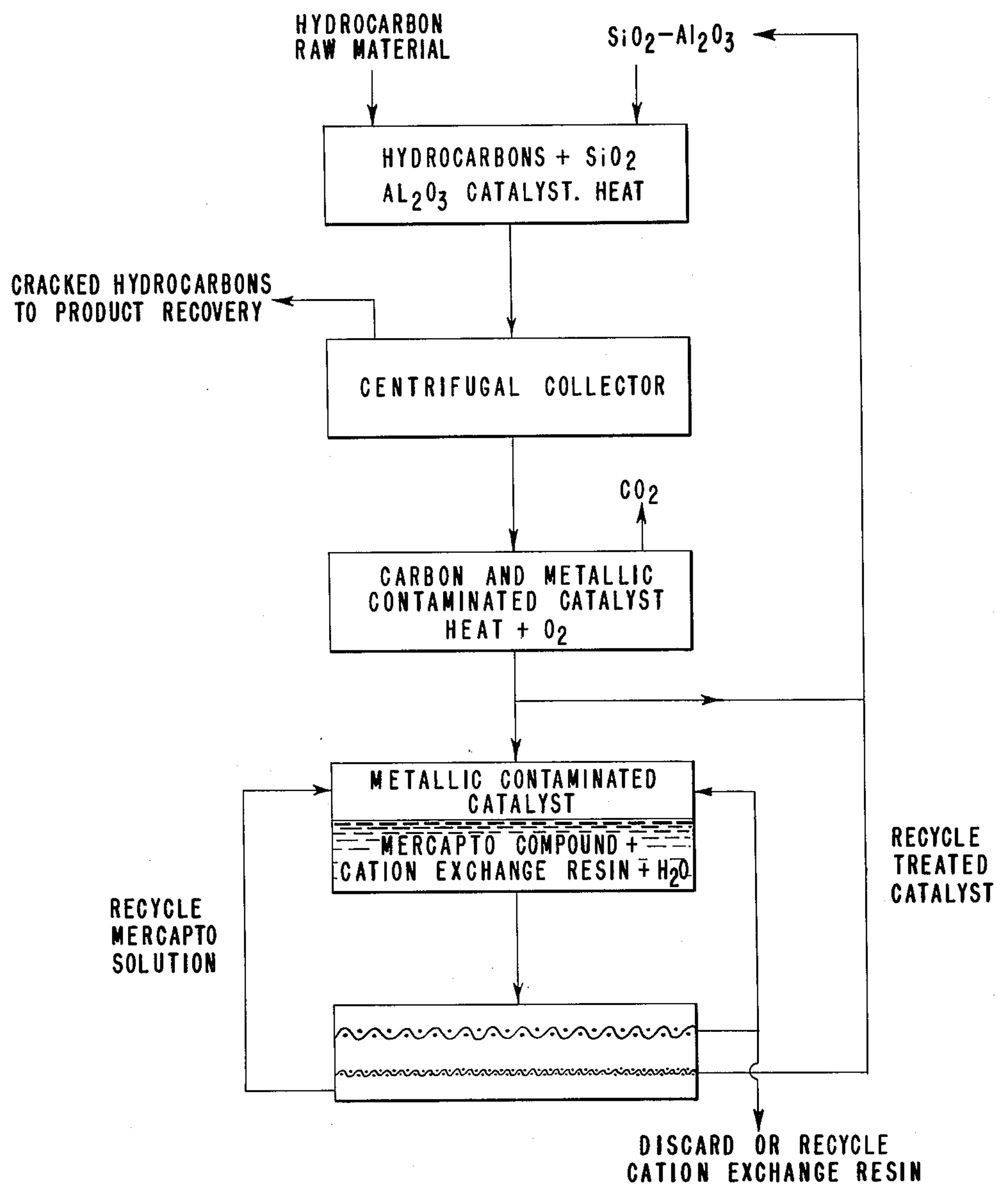
INVENTOR
LYNN G. McLAUGHLIN
BY W. Frederick Mayer, Jr.
ATTORNEY

United States Patent Office 3,224,979

Patented Dec. 21, 1965

3,224,979

REMOVAL OF METAL CONTAMINANTS BY USE OF MERCAPTO-COMPOUND AND CATION EXCHANGE RESIN

Lynn G. McLaughlin, Lynnfield, Wilmington, Del., assignor to E. I. du Pont de Nemours and Company, Wilmington, Del., a corporation of Delaware Filed Feb. 8, 1963, Ser. No. 257,298
6 Claims. (Cl. 252—414)

This invention relates to compositions and processes for the treatment of a silica-alumina cracking catalyst used in catalytic cracking processes and is more particularly directed to compositions and processes for the removal of traces of heavy metals from such a catalyst by contacting it with aqueous solutions of mercapto compounds.

The processes of the invention can be practiced using aqueous solutions of mercapto compounds which have suspended therein a cation exchange resin.

The mercapto compounds which can be used according to this invention are those of the formula $$R-\overset{H}{\underset{\underset{H}{S}}{\overset{|}{C}}}-X$$

where

R is hydrogen, —COOH, an alkyl radical containing from 1 to 4 carbon atoms, or a hydroxyalkyl radical containing from 1 to 5 carbon atoms;

X is $(CHR')_nOH$, $(CHR')_nNH_2$, or $(CHR')_{n-1}COOH$ where

R′ is hydrogen, —COOH, a hydroxyalkyl radical containing from 1 to 4 carbon atoms, or an alkyl radical containing from 1 to 4 carbon atoms; and $n$ is 1 or 2.

Preferred for use are 2-mercaptoethanol
2-mercaptopropanol
1-mercaptopropanol-2
2-mercaptobutanol
2-mercaptobutanol-3
1-thioglycerol
2-thioglycerol
Alpha-thiosorbitol
Mercaptosuccinic acid
Mercaptoethylamine The 2-mercaptoethanol obtains exceptional results and is particularly preferred.

In the catalytic cracking of hydrocarbons a silica-alumina catalyst is used to aid in the cracking of the hydrocarbon raw materials into the desired hydrocarbon products. Generally, the catalytic cracking process involves continuously and simultaneously charging the cracking reaction zone with the hydrocarbon raw ma terials and the silica-alumina cracking catalyst. Following the heating of these materials in the cracking zone, the desired cracked hydrocarbon products are separated from the silica-alumina catalyst in a centrifugal mechanical collector. The collected catalyst is further heat treated to remove carbon deposits from its surface and then is reintroduced into the cracking zone along with additional hydrocarbon raw material.

During the cracking process traces of heavy metals of the transition series of elements, and in particular iron, nickel and vanadium, which are present in the hydrocarbon raw material gradually deposit on the silica-alumina catalyst. Since the cracking process involves the continuous reuse of the silica-alumina catalyst, these metallic contaminates accumulate over a relatively short period of time until they are present in excessive amounts.

The silica-alumina catalyst which is excessively contaminated with heavy metallic impurities produces less of the desired hydrocarbon products from the hydrocarbon raw material and in fact it catalyzes a reaction which produces gaseous hydrogen and solid carbon or coke. Since an increasingly greater proportion of the hydrocarbon raw material is cracked to produce undesirable hydrogen gas and solid carbon as the catalyst becomes increasingly contaminated with metallic impurities, a correspondingly smaller yield of desired liquid hydrocarbons is produced. In other words, the efficiency of the cracking process for producing the desired end products is continuously diminished.

This carbon and hydrogen gas producing tendency provides a convenient means for measuring the catalyst efficiency. As set forth by Birkhimer et al., in "A Bench Scale Test Method for Evaluating Cracking Catalysts," Proceedings of the American Petroleum Institute, Division of Refining, volume 27 (III), (1947), and also in an article by J. J. Rothrock et al. entitled, "Fluid Cracking Catalyst Contamination," Industrial and Engineering Chemistry, volume 49, page 272 (1957), the carbon producing tendency of the catalyst is expressed as the carbon producing factor (C.P.F.).

According to this method, the C.P.F. is defined as the ratio of carbon produced from a freshly prepared, standard silica-alumina catalyst during a single cycle in the cracking process compared to the carbon produced by a silica-alumina catalyst which is contaminated with metallic impurities during an equal time period of one cycle in the cracking process. Thus, a C.P.F. of 3 means that the catalyst which is contaminated with metallic impurities produces 3 times as much carbon during a single cracking cycle as the uncontaminated, fresh catalyst during the same cracking cycle.

From the above, the effectiveness of any process in removing metallic contaminates from the catalyst can be readily and easily determined. Ideally, the process employed is most effective if it is capable of removing substantially all traces of metallic impurities from the catalyst. However not all of the metal present is catalytically active and it often is not necessary to remove all metallic impurities to return the C.P.F. to 1. In any case, the process will be capable of maintaining, in essense, a continuous supply of fresh, standard catalyst.

Methods used in the past to alleviate contamination of the silica-alumina catalyst with metallic impurities have for the most part been ineffective or prohibitively expensive. For example, one method merely replenishes the supply of catalyst by introducing substantially large quantities of freshly prepared catalyst into the cracking process while at the same time removing an equal portion of contaminated catalyst. The relatively high cost of the silica-alumina catalyst is a significant factor in this method and substantially increases the cost of the hydrocarbon products produced in the catalytic cracking process.

Another method contemplates treatment of the silica-alumina catalyst with sulfuric acid and cation exchange resins. However, the sulfuric acid attacks the alumina in the catalyst such that the supply of catalyst must also be replenished with large quantities of freshly prepared silica-alumina catalyst.

I have found that treating the silica-alumina catalyst at a stage in its cyclic travel in the cracking process with an aqueous solution of one or more of the above-named mercapto compounds, 2-mercaptoethanol in particular, is effective to remove substantially all traces of catalytically active heavy metal contaminates deposited on its surface during the hydrocarbon cracking process and even in some instances to remove traces of metallic contaminates which were present in the silica-alumina catalyst as freshly prepared. Thus, the C.P.F. of the catalyst treated in accordance with the present invention ranges from .5 to 5.0 and preferably from 1.0 to 3.5.

An additional advantage of the composition of the present invention is that the silica-alumina catalyst is not attacked. Accordingly, the only replenishment of silica-alumina catalyst required is that very minor residual amount of catalyst that is destroyed or lost in the mechanical collecting apparatus.

The aqueous solution should contain from .001% to 25% by weight of the mercapto compound with a preferred range being about .005% to 10% by weight and an even more preferred range being .1% to 5%. The optimum amount to be used in any particular catalytic cracking process will be apparent to those skilled in the art.

The pH of the aqueous solution ranges from 3.0 to 11.0 and preferably ranges from pH 5 to 6. If desired the pH can be adjusted by the addition of acids or bases.

For reasons which will be described further hereinafter, the mercapto solution can also contain a cation exchange resin. When it is present, the cation exchange resin constitutes .5 to 50.0% by weight of the aqueous solution, and more preferably ranges from 1.0% to 30% by weight.

In the process of the present invention the silica-alumina catalyst is contacted during its regeneration cycle with an aqueous solution of one or more of the above-named mercapto compounds. It is particularly preferred to contact the silica-alumina catalyst with the aqueous solution of mercapto compounds at a stage subsequent to its heat treatment for the removal of carbon and prior to its being reintroduced into the cracking zone.

Referring to the accompanying drawing, there is shown a schematic flow diagram illustrating the catalytic hydrocarbon cracking process in which heavy metal contaminates are removed from the silica-alumina catalyst by a process and composition of the present invention.

Upon heating the hydrocarbon raw materials in the presence of the silica-alumina catalyst in the cracking zone, carbon and metallic impurities are deposited on the surface of the catalyst. The contaminated catalyst is carried upwards and out through the cracking zone in the gas stream along with the fractionated hydrocarbon products. From the cracking zone the hydrocarbon products and the catalyst are introduced into a mechanical cyclone separator where the catalyst is separated from the gas stream and hydrocarbon products. The contaminated catalyst is then heat treated at a temperature of about 220° F. in the presence of oxygen to remove the carbon or coke deposited on its surface. The catalyst, which is now substantially free from carbon deposits, is introduced into an aqueous solution of a mercapto compound at a temperature ranging from about 75° F. to about 250° F. and preferably ranging from about 100° F. to 175° F. for a period ranging from 1 to 8 hours and preferably from 2 to 6 hours.

The treated catalyst and the solution containing the mercapto compound are then passed through a filter. The mercaptan containing filtrate is returned to the mercaptan solution bath and the catalyst residue is passed to an oven where it is dried at a temperature ranging from 125° to 175° C. The silica-alumina catalyst thus treated is substantially free of all metallic contaminates and is reintroduced along with hydrocarbon raw materials into the cracking zone of the cracking process.

For practical reasons the removal of metallic impurities from the catalyst by the aqueous solution of mercapto compounds is preferably performed upon only a portion of the total catalyst being used in the process.

However, it is a continuous operation such that a portion of the catalyst being used in the cracking process is always being treated. In this manner a constant supply of silica-alumina catalyst from which the metallic impurities have been removed is reintroduced into the cracking process.

The exact portion of the total amount of catalyst used in the process which is withdrawn for removal of the metallic impurities during any given period is dependant, for the most part, on the particular hydrocarbon raw material being cracked. For example, when cracking low molecular weight gas oils which are relatively low in metallic impurity content, as little as 5 percent or less of the total catalyst need be treated during a twenty-four hour continuous cracking cycle.

On the other hand, when cracking high molecular weight hydrocarbon, such as residual materials which are high in metallic contamination, as much as 40 percent or more of the total catalyst could be treated during an equal twenty-four hour operating cycle. In general, however, the proportion of catalyst that is treated in the process of the present invention during a twenty-four hour operating cycle usually averages in the range from 5 to 40% of the total catalyst used and more likely from about 10 to 25%.

In an alternative and preferred method of practicing the process of the present invention, a cation exchange resin is also used to remove the metallic impurities from the mercaptan solution such that the mercaptan solution can be continuously reused. The cation exchange resin can be introduced into the metallic removal process at a stage subsequent to the above described filtration operation where the catalyst and the aqueous mercaptan solution are separated. In this instance, instead of returning the recovered mercaptan solution directly back to the cleaning tank it is first treated with the cation exchange resin, passed through a screening unit to remove the cation exchange resin, and then is returned to the cleaning tank.

As another alternative the cation exchange resin can be present in the mercaptan solution such that the metallic impurities are removed from the silica-alumina catalyst by the mercaptan solution and from the mercaptan solution by the cation exchange resin substantially simultaneously. Following this method of practicing the progress of the present invention, the cation exchange resin is separated from the catalyst by screening. This is possible because the particle size of the commercially employed catalyst is such that it will pass through a 100 mesh U.S. standard sieve and the particle size of the cation exchange resin as produced commercially is in the range of 10 to 50 mesh U.S. standard sieve.

Subsequent to separation of the catalyst from the cation exchange resin the catalyst is oven dried as described above and reintroduced along with the hydrocarbon raw materials into the cracking zone of the catalyst cracking process.

Reference to the following examples illustrating specific embodiments of the invention will enable one skilled in the art to further understand and practice the present invention.

*Example I*

A used petroleum cracking catalyst which has had essentially all of the carbon burned off but which is contaminated with iron and nickel, is treated as follows:

One hundred grams of catalyst is slurried with 300 ml. of 5% 2-mercaptoethanol solution at 100° C. for 4 hours. The catalyst is removed by filtration, washed thoroughly with distilled water and dried in an oven.

The C.P.F. of the catalyst before treatment was 3.5. After treatment, the C.P.F. was reduced to 1.3.

The above experiment is repeated using 2-mercaptoethylamine instead of 2-mercaptoethanol with essentially the same results.

*Example II*

A used petroleum cracking catalyst which has had essentially all of the carbon burned off but which contains 25% $Al_2O_3$, 0.63% Fe and 0.15% Ni was treated as follows:

Fifty grams of catalyst was slurried for 3½ hours at 150° F. with 500 ml. of 0.5% 2-mercaptoethanol. The catalyst was removed by filtration, washed thoroughly and oven dried. The iron content was reduced to 0.5% and the nickel to 0.05%. The C.P.F. prior to treatment was 9.7 and after treatment 3.1.

This experiment was repeated using mercaptoacetic acid instead of 2-mercaptoethanol with essentially the same results.

*Example III*

The contaminated catalyst described in Example II was treated as follows:

A sulfonic acid type cation exchange resin was washed on a 30 mesh screen and only that portion retained by the screen used. One hundred ml. of the resin and 50 gms. of the catalyst was slurried in 500 ml. to 1% 2-mercaptoethanol for 4 hours at 100° C.

The mixture was poured onto an 80 mesh screen which retained the cation exchange resin but allowed the catalyst to pass through. The catalyst was then separated by filtration, washed thoroughly and oven dried.

The iron content had been reduced to 0.30% and the nickel to 0.02%. The C.P.F. of the treated catalyst was 1.5.

I claim:

1. A composition for removing metallic impurities from the surface of silica-alumina hydrocarbon cracking catalysts consisting essentially of an aqueous solution of about .001 to 25%, by weight, of a compound of the formula $$\begin{array}{c} H \\ R-C-X \\ | \\ S \\ H \end{array}$$

where

R is selected from the group consisting of hydrogen, —COOH, alkyl radicals containing from 1 to 4 carbon atoms, and hydroxyalkyl radicals containing from 1 to 5 carbon atoms; and X is selected from the group consisting of $(CHR')_nOH$, $(CHR')_nNH_2$, and $(CHR')_{n-1}COOH$ where R' is selected from the group consisting of hydrogen, —COOH, hydroxyalkyl radicals containing from 1 to 4 carbon atoms and alkyl radicals containing from 1 to 4 carbon atoms; and

*n* is a whole positive number less than 3, said aqueous solution containing suspended therein 0.5 to 50% by weight of a cation exchange resin.

2. A composition for removing metallic impurities from the surface of silica-alumina hydrocarbon cracking catalysts consisting essentially of an aqueous solution of about .001 to 25%, by weight, of 2-mercaptoethanol, said aqueous solution containing suspended therein 0.5 to 50% by weight of a cation exchange resin.

3. A method for reducing the amount of carbon and hydrogen gas produced by a catalytic hydrocarbon cracking process which uses a silica-alumina cracking catalyst which is contaminated with carbon and hydrogen gas producing metallic impurities selected from the group consisting of iron, nickel and vanadium as a result of being used during the period of at least one cycle in said cracking process which comprises, removing from said process at least a portion of said contaminated catalyst at a stage subsequent to the removal of carbon from the surface thereof, contacting said catalyst for a period ranging from 1 to 8 hours with an aqueous solution of .001 to 25% by weight of a compound having the formula $$\begin{array}{c} H \\ R-C-X \\ | \\ S \\ H \end{array}$$

where

R is selected from the group consisting of hydrogen, —COOH, alkyl radicals containing from 1 to 4 carbon atoms, and hydroxyalkyl radicals containing from 1 to 5 carbon atoms; and X is selected from the group consisting of $(CHR')_nOH$, $(CHR')_nNH_2$, and $(CHR')_{n-1}COOH$ where R' is selected from the group consisting of hydrogen, —COOH, hydroxyalkyl radicals containing from 1 to 4 carbon atoms and alkyl radicals containing from 1 to 4 carbon atoms; and

*n* is a whole positive number less than 3, separating the contacted catalyst from said aqueous solution and returning said contacted catalyst to said catalyst hydrocarbon cracking process.

4. A method for reducing the amount of carbon and hydrogen gas produced by a catalytic hydrocarbon cracking process which uses a silica-alumina cracking catalyst which is contaminated with carbon and hydrogen gas producing metallic impurities selected from the group consisting of iron, nickel and vanadium as a result of being used during the period of at least one cycle in said cracking process which comprises, removing from said process at least a portion of said contaminated catalyst at a stage subsequent to the removal of carbon from the surface thereof, contacting said catalyst for a period ranging from 1 to 8 hours with an aqueous solution of .001 to 25% by weight of a compound having the formula $$\begin{array}{c} H \\ R-C-X \\ | \\ S \\ H \end{array}$$

where

R is selected from the group consisting of hydrogen, —COOH, alkyl radicals containing from 1 to 4 carbon atoms, and hydroxyalkyl radicals containing from 1 to 5 carbon atoms; and X is selected from the group consisting of $(CHR')_nOH$, $(CHR')_nNH_2$, and $(CHR')_{n-1}COOH$ where R' is selected from the group consisting of hydrogen, —COOH, hydroxyalkyl radicals containing from 1 to 4 carbon atoms and alkyl radicals containing from 1 to 4 carbon atoms; and

*n* is a whole positive number less than 3, said aqueous solution containing suspended therein 0.5 to 50% by weight of a cation exchange resin, separating the contacted catalyst and the cation exchange resin from said aqueous solution by filtration, separating the catalyst from the cation exchange resin by screening, and returning said contacted and separated catalyst to said catalytic hydrocarbon cracking process.

5. A method for reducing the amount of carbon and hydrogen gas produced by a catalytic hydrocarbon cracking process which uses a silica-alumina cracking catalyst which is contaminated with carbon and hydrogen gas producing metallic impurities selected from the group consisting of iron, nickel and vanadium as a result of being used during the period of at least one cycle in said cracking process which comprises, removing from said process at least a portion of said contaminated catalyst at a stage subsequent to the removal of carbon from the surface thereof, contacting said catalyst for a period ranging from 1 to 8 hours with an aqueous solution of .001 to 25% by weight of 2-mercaptoethanol, separating the contacted catalyst from said aqueous solution and returning said contacted catalyst to said catalytic hydrocarbon cracking process.

6. A method for reducing the amount of carbon and hydrogen gas produced by a catalytic hydrocarbon cracking process which uses a silica-alumina cracking catalyst which is contaminated with carbon and hydrogen gas producing metallic impurities selected from the group consisting of iron, nickel and vanadium as a result of being used during the period of at least one cycle in said cracking process which comprises, removing from said process at least a portion of said contaminated catalyst at a stage subsequent to the removal of carbon from the surface thereof, contacting said catalyst for a period ranging from 1 to 8 hours with an aqueous solution of .001 to 25% by weight of 2-mercaptoethanol, said aqueous solution containing suspended therein 0.5 to 50% by weight of a cation exchange resin, separating the contacted catalyst and the cation exchange resin from said aqueous solution by filtration, separating the catalyst from the cation exchange resin by screening, and returning said contacted and separated catalyst to said catalytic hydrocarbon cracking process.

References Cited by the Examiner

UNITED STATES PATENTS

| | | | |
|---|---|---|---|
| 3,020,239 | 2/1962 | Flinn et al. | 252—413 |
| 3,041,270 | 6/1962 | Leum et al. | 252—412 |

FOREIGN PATENTS 596,177 4/1960 Canada.

OTHER REFERENCES

Rose et al.: The Condensed Chemical Dictionary, 6th Edition. Reinhold Publishing Corp., New York, 1961, pages 591, 592, 712, and 1135.

MAURICE A. BRINDISI, *Primary Examiner.*